United States Patent
Mo et al.

(10) Patent No.: US 10,714,788 B2
(45) Date of Patent: Jul. 14, 2020

(54) SILICATE COMPOUNDS AS SOLID LI-ION CONDUCTORS

(71) Applicants: UNIVERSITY OF MARYLAND, COLLEGE PARK, College Park, MD (US); TOYOTA MOTOR ENGINEERING & MANUFACTURING NORTH AMERICA, INC., Plano, TX (US)

(72) Inventors: Yifei Mo, Fulton, MD (US); Xingfeng He, Greenbelt, MD (US); Chen Ling, Ann Arbor, MI (US); Ying Zhang, Ann Arbor, MI (US)

(73) Assignees: UNIVERSITY OF MARYLAND, COLLEGE PARK, College Park, MD (US); TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 16/013,495

(22) Filed: Jun. 20, 2018

(65) Prior Publication Data

US 2019/0393547 A1 Dec. 26, 2019

(51) Int. Cl.
| H01M 10/0562 | (2010.01) |
| H01M 10/0525 | (2010.01) |
| C01B 33/32 | (2006.01) |
| C01B 33/26 | (2006.01) |

(52) U.S. Cl.
CPC ......... *H01M 10/0562* (2013.01); *C01B 33/26* (2013.01); *C01B 33/32* (2013.01); *H01M 10/0525* (2013.01); *C01P 2002/72* (2013.01); *C01P 2002/74* (2013.01); *C01P 2002/77* (2013.01); *C01P 2006/40* (2013.01); *H01M 2300/0074* (2013.01)

(58) Field of Classification Search
None
See application file for complete search history.

(56) References Cited

U.S. PATENT DOCUMENTS

| 7,358,011 B2 | 4/2008 | Fukuoka et al. |
| 8,592,090 B2 | 11/2013 | Miyashiro et al. |
| 8,808,912 B2 | 8/2014 | Thackeray et al. |
| 2003/0183158 A1* | 10/2003 | Maruska ................ C30B 25/02 117/84 |
| 2004/0106040 A1* | 6/2004 | Fukuoka ............. H01M 4/0428 429/212 |
| 2004/0200317 A1* | 10/2004 | Naito .................. C22C 32/0089 75/244 |
| 2010/0143769 A1 | 6/2010 | Lee et al. |
| 2011/0143212 A1* | 6/2011 | Angell ............. H01M 10/0567 429/307 |
| 2011/0151340 A1* | 6/2011 | Kaskhedikar .......... H01G 9/038 429/339 |
| 2011/0171539 A1* | 7/2011 | Patoux .................. H01M 4/505 429/341 |
| 2012/0288771 A1* | 11/2012 | Lim ...................... H01M 4/131 429/338 |
| 2013/0234098 A1* | 9/2013 | Rothschild ............. G11C 13/00 257/4 |
| 2013/0266878 A1 | 10/2013 | Vajo et al. |
| 2015/0188127 A1 | 7/2015 | Niimi et al. |
| 2017/0149050 A1 | 5/2017 | Hirose et al. |
| 2017/0207450 A1 | 7/2017 | Takahashi et al. |
| 2017/0229742 A1 | 8/2017 | Aykol et al. |
| 2017/0309950 A1 | 10/2017 | Minami et al. |
| 2017/0331092 A1* | 11/2017 | Chen .................... H01M 2/168 |

FOREIGN PATENT DOCUMENTS

JP 3966806 B2 8/2007

OTHER PUBLICATIONS

Brandes et al (Li10Si2PbIIO10 . . . The first "mixed" silicate-plumbate(II) (Year: 1994).*
H. Völienkle et al, "Die Kristallstruktur der Verbindung $Li_6[Si_2O_7]$", Monatshefte für Chemie, 100:295-303 (1969).

* cited by examiner

*Primary Examiner* — Scott J. Chmielecki
(74) *Attorney, Agent, or Firm* — Oblon, McClelland, Maier & Neustadt, L.L.P.

(57) ABSTRACT

Solid-state lithium ion electrolytes of lithium silicate based composites are provided which contain an anionic framework capable of conducting lithium ions. An activation energy for lithium ion migration in the solid state lithium ion electrolytes is 0.5 eV or less and room temperature conductivities are greater than $10^{-5}$ S/cm. Composites of specific formulae are provided and methods to alter the composite materials with inclusion of aliovalent ions shown. Lithium batteries containing the composite lithium ion electrolytes are also provided.

5 Claims, 16 Drawing Sheets
(5 of 16 Drawing Sheet(s) Filed in Color)

Fig. 3

| Peak Position | Intensity | Peak Position | Intensity |
|---|---|---|---|
| 16.2479 | 12.11276 | 63.83924 | 1.623354 |
| 8.1788 | 1.404444 | 64.47727 | 4.00614 |
| 21.54685 | 24.84037 | 65.11036 | 14.81712 |
| 24.47424 | 52.16229 | 66.36233 | 1.994546 |
| 25.82217 | 100 | 68.22521 | 2.251318 |
| 29.51721 | 2.55693 | 68.84072 | 6.870068 |
| 31.76245 | 21.87466 | 69.4461 | 11.18868 |
| 36.83645 | 31.47477 | 71.87751 | 1.142463 |
| 41.37599 | 19.87096 | 72.47622 | 1.013817 |
| 45.53283 | 11.02991 | 73.07147 | 7.152918 |
| 46.33202 | 14.08896 | 74.2697 | 1.408121 |
| 47.11876 | 25.3426 | 74.86393 | 1.866895 |
| 50.16412 | 1.400757 | 76.62822 | 1.321648 |
| 50.16782 | 6.299313 | 77.21919 | 6.951218 |
| 50.90792 | 1.677766 | 77.80152 | 2.856681 |
| 51.63852 | 3.192243 | 77.80733 | 4.609617 |
| 52.3672 | 2.710707 | 78.96965 | 2.100807 |
| 53.08348 | 1.024344 | 80.71694 | 3.283642 |
| 53.08703 | 1.533868 | 87.0457 | 1.141493 |
| 53.79837 | 1.703558 | 87.05139 | 1.8301 |
| 59.27967 | 3.672987 | 87.61345 | 1.091089 |
| 61.2603 | 8.355629 | 88.19091 | 1.044897 |
| 61.90674 | 1.211729 | 88.75824 | 1.753767 |
| 62.55731 | 2.391889 | 89.90253 | 1.103892 |
| 63.19611 | 9.356679 | 89.91388 | 1.839018 |
| 63.20247 | 1.669189 | | |

Fig. 6

| Peak Position | Intensity | Peak Position | Intensity | Peak Position | Intensity | Peak Position | Intensity |
|---|---|---|---|---|---|---|---|
| 6.007451 | 100 | 40.56762 | 3.928072 | 58.1925 | 1.331729 | 83.47334 | 1.079317 |
| 12.03149 | 12.67244 | 42.60016 | 4.805909 | 58.34214 | 1.287869 | 85.96565 | 1.158441 |
| 14.81715 | 39.20355 | 42.67701 | 2.238511 | 58.59997 | 4.958245 | 87.247 | 1.026962 |
| 17.10575 | 19.3591 | 42.92952 | 1.275445 | 58.65081 | 1.050918 | 87.79036 | 1.034188 |
| 17.54447 | 1.451785 | 43.03757 | 1.531352 | 58.69337 | 1.549172 | 89.41569 | 1.038346 |
| 19.50615 | 14.03868 | 44.2295 | 3.352545 | 59.1444 | 2.456355 | | |
| 19.56053 | 9.294745 | 44.30764 | 2.8313 | 59.27139 | 1.816277 | | |
| 20.9654 | 13.29288 | 44.62616 | 3.35048 | 60.31308 | 1.772946 | | |
| 22.64277 | 4.785834 | 45.51504 | 2.09597 | 60.48037 | 2.417336 | | |
| 22.96482 | 15.65448 | 46.23577 | 4.507761 | 60.66487 | 4.017069 | | |
| 23.04236 | 3.725132 | 46.65322 | 3.518169 | 61.02517 | 1.024041 | | |
| 23.43135 | 2.109386 | 46.68655 | 2.954673 | 61.24575 | 1.403174 | | |
| 23.46181 | 2.064594 | 46.92318 | 2.427572 | 61.31387 | 1.355818 | | |
| 25.688 | 14.4652 | 47.0889 | 1.788351 | 61.50103 | 1.629997 | | |
| 25.74387 | 13.13744 | 47.38427 | 1.628416 | 61.52091 | 2.156514 | | |
| 27.38945 | 4.721957 | 47.53234 | 1.076268 | 62.60117 | 1.217985 | | |
| 27.48152 | 8.703702 | 47.5631 | 2.859359 | 62.73079 | 1.290359 | | |
| 29.09495 | 9.328889 | 47.98674 | 1.285576 | 64.37224 | 1.098672 | | |
| 29.16964 | 20.19941 | 48.76025 | 1.534649 | 64.39406 | 3.221629 | | |
| 29.25196 | 11.69507 | 49.74982 | 3.150763 | 64.44319 | 1.679198 | | |
| 29.88956 | 9.014172 | 49.77394 | 0.052311 | 65.00935 | 1.067649 | | |
| 31.0283 | 3.153973 | 49.78157 | 1.584559 | 65.09481 | 1.868976 | | |
| 31.73255 | 5.445207 | 50.08634 | 1.798143 | 65.75359 | 1.690986 | | |
| 32.42733 | 3.805577 | 51.51041 | 3.887411 | 66.45018 | 1.605446 | | |
| 32.52891 | 3.376951 | 51.66615 | 1.032835 | 66.58894 | 2.603145 | | |
| 33.33426 | 15.57787 | 51.68055 | 2.711262 | 67.84727 | 1.302686 | | |
| 33.42239 | 15.45081 | 51.77337 | 1.557865 | 67.98741 | 1.333829 | | |
| 34.60832 | 2.008908 | 51.81964 | 4.500418 | 68.11809 | 1.596002 | | |
| 35.40424 | 5.31647 | 52.88723 | 3.237126 | 68.44889 | 1.281582 | | |
| 35.43561 | 7.72272 | 54.51868 | 3.316668 | 69.32455 | 1.015653 | | |
| 35.518 | 5.005273 | 54.5782 | 4.257969 | 70.56964 | 1.848675 | | |
| 35.5597 | 4.367336 | 55.08922 | 1.802129 | 71.50278 | 1.232907 | | |
| 36.64984 | 6.14725 | 55.156 | 1.537857 | 72.311 | 1.268433 | | |
| 36.6789 | 8.219535 | 55.96495 | 1.181278 | 72.33644 | 1.003344 | | |
| 37.09187 | 1.363271 | 56.07458 | 2.062874 | 72.44374 | 1.693126 | | |
| 37.17219 | 1.459496 | 56.17325 | 2.877533 | 72.60894 | 1.00427 | | |
| 37.51219 | 4.107425 | 56.2083 | 1.91758 | 73.00935 | 1.439835 | | |
| 37.56192 | 11.41405 | 56.25205 | 1.015331 | 73.6239 | 0.010579 | | |
| 37.8835 | 3.165143 | 56.36272 | 2.329652 | 75.05838 | 1.31477 | | |
| 38.17197 | 2.019173 | 56.4034 | 1.186505 | 75.09227 | 1.131717 | | |
| 38.18063 | 7.614172 | 56.72632 | 1.713695 | 75.9134 | 1.229636 | | |
| 38.20024 | 7.308822 | 56.84169 | 3.172826 | 77.16751 | 1.223165 | | |
| 38.26992 | 1.527909 | 57.31518 | 1.440024 | 77.18543 | 1.074125 | | |
| 39.1683 | 3.154314 | 57.40154 | 1.181437 | 81.75436 | 1.137192 | | |
| 39.22584 | 5.170256 | 57.9253 | 2.502488 | 83.14383 | 1.23234 | | |
| 40.50234 | 5.488567 | 57.93961 | 1.901476 | 83.24331 | 1.053648 | | |

Fig. 9

| Peak Position | Intensity |
|---|---|
| 19.55853 | 9.059159 |
| 25.28058 | 100 |
| 34.21839 | 3.739057 |
| 37.81362 | 1.357166 |
| 39.71789 | 4.019699 |
| 43.01901 | 3.450111 |
| 47.57618 | 20.94388 |
| 51.90921 | 1.501335 |
| 56.0805 | 9.612192 |
| 61.26885 | 1.234774 |
| 63.65281 | 4.080382 |
| 64.75145 | 10.63853 |
| 70.82773 | 3.498605 |
| 72.08533 | 4.037341 |
| 75.31848 | 3.02244 |
| 77.42385 | 3.742432 |
| 77.77052 | 5.872373 |
| 84.39846 | 1.855405 |
| 85.59532 | 1.360553 |

Fig. 12

| Peak Position | Intensity | Peak Position | Intensity | Peak Position | Intensity |
|---|---|---|---|---|---|
| 17.9196 | 10.65818 | 52.42639 | 13.2902 | 75.89815 | 2.617175 |
| 23.09495 | 80.69699 | 52.70191 | 10.88266 | 76.63495 | 3.644692 |
| 23.85488 | 66.01417 | 53.92306 | 8.309819 | 76.94623 | 7.839764 |
| 23.98976 | 62.79232 | 55.70853 | 2.100896 | 77.06605 | 4.658976 |
| 26.20527 | 24.77555 | 56.20084 | 4.204426 | 77.11461 | 5.363148 |
| 29.13588 | 12.64651 | 58.58327 | 8.656176 | 77.14036 | 2.262771 |
| 29.99581 | 19.46891 | 60.40473 | 14.53824 | 77.19146 | 11.60659 |
| 30.10503 | 2.181863 | 61.22601 | 6.575527 | 77.41571 | 9.909425 |
| 34.4159 | 100 | 61.41304 | 2.533685 | 78.82273 | 1.497366 |
| 36.29723 | 32.56608 | 61.44672 | 7.212481 | 78.91912 | 1.381372 |
| 38.47182 | 73.37677 | 61.50897 | 1.16991 | 79.15704 | 1.958874 |
| 39.25624 | 5.419506 | 62.06827 | 2.406246 | 79.47621 | 1.647748 |
| 39.49862 | 14.74462 | 62.41615 | 2.175434 | 80.23799 | 2.167644 |
| 39.67029 | 28.52208 | 62.58517 | 1.139752 | 80.75473 | 4.159858 |
| 41.26341 | 31.18844 | 63.45877 | 9.347064 | 80.95055 | 5.662607 |
| 42.74317 | 2.821754 | 64.09562 | 40.16854 | 81.22735 | 3.656976 |
| 43.90178 | 3.983559 | 64.35175 | 2.345082 | 85.0343 | 1.442405 |
| 43.98059 | 3.965684 | 64.53363 | 2.531306 | 85.23057 | 0.311072 |
| 45.42713 | 8.971548 | 66.85889 | 4.919615 | 85.47334 | 1.306638 |
| 47.20132 | 1.968491 | 69.73777 | 2.424238 | 86.93767 | 3.200572 |
| 48.18012 | 5.590048 | 70.16105 | 12.45498 | 87.43465 | 3.633515 |
| 48.51207 | 12.59527 | 70.50953 | 15.19326 | 87.47942 | 1.373259 |
| 48.83034 | 1.64349 | 71.48735 | 16.66483 | 87.59888 | 3.67703 |
| 49.12033 | 5.085645 | 72.46374 | 4.085773 | 87.87319 | 1.176277 |
| 51.23648 | 8.283685 | 72.55279 | 3.338849 | 89.13315 | 1.340839 |
| 51.37662 | 1.660141 | 73.30286 | 1.471363 | 89.48761 | 1.467588 |
| 52.12422 | 8.91299 | 73.70383 | 5.139074 | 89.61372 | 3.095342 |
| 52.3318 | 6.465867 | 74.15916 | 3.661671 | | |

Fig. 15

| Peak Position | Intensity | Peak Position | Intensity |
|---|---|---|---|
| 16.85557 | 17.53567 | 63.0793 | 26.34538 |
| 19.52056 | 2.989581 | 63.20818 | 2.365496 |
| 21.8635 | 69.54291 | 63.45764 | 13.91522 |
| 22.43744 | 65.65181 | 64.61621 | 14.06709 |
| 23.99844 | 9.750065 | 64.72354 | 3.069198 |
| 24.45307 | 60.48541 | 64.76092 | 5.722171 |
| 27.85417 | 35.59327 | 65.13158 | 1.947027 |
| 28.1961 | 11.4776 | 66.84887 | 3.89992 |
| 31.06315 | 25.73355 | 68.47949 | 38.12191 |
| 32.73523 | 100 | 68.61004 | 12.94178 |
| 34.09033 | 75.7862 | 69.53675 | 16.98871 |
| 34.14355 | 15.84051 | 70.19219 | 9.12343 |
| 34.24272 | 39.79073 | 71.45946 | 9.713355 |
| 35.60522 | 95.8529 | 71.78283 | 1.101563 |
| 36.64898 | 21.0783 | 71.8729 | 1.072314 |
| 37.39757 | 54.38693 | 71.88957 | 6.459613 |
| 38.60952 | 13.49596 | 71.90847 | 30.58123 |
| 39.63834 | 2.882076 | 72.06539 | 3.221213 |
| 41.19679 | 1.623568 | 72.18619 | 4.855091 |
| 42.17297 | 3.701106 | 73.33519 | 1.621985 |
| 42.20562 | 33.36026 | 73.52156 | 1.79914 |
| 44.24319 | 1.632526 | 73.62729 | 1.122145 |
| 44.57808 | 12.88558 | 74.58066 | 7.383069 |
| 45.79822 | 13.68119 | 76.02782 | 6.339797 |
| 45.86487 | 0.571705 | 76.53144 | 2.928094 |
| 46.65048 | 16.12466 | 76.75385 | 3.249248 |
| 46.78374 | 6.170001 | 77.17295 | 4.583814 |
| 47.01273 | 3.296663 | 77.21385 | 2.168848 |
| 48.27497 | 22.09298 | 79.76061 | 6.706725 |
| 49.139 | 28.03906 | 80.15916 | 3.312984 |
| 49.48742 | 6.642443 | 80.4272 | 0.254516 |
| 50.11844 | 19.2583 | 81.05257 | 1.572159 |
| 52.16798 | 8.718842 | 81.37184 | 3.219645 |
| 53.42223 | 3.887274 | 81.37845 | 2.651168 |
| 54.24055 | 2.539814 | 82.78515 | 3.578379 |
| 55.34615 | 2.977208 | 85.22194 | 2.236107 |
| 55.42607 | 3.23317 | 85.34829 | 3.43079 |
| 56.60606 | 3.173523 | 86.9572 | 6.860412 |
| 57.00678 | 3.696286 | 87.02307 | 2.908254 |
| 57.4765 | 1.586979 | 87.36579 | 1.394484 |
| 57.55032 | 35.15291 | 87.7266 | 1.05373 |
| 58.30871 | 8.500108 | 88.61808 | 1.292792 |
| 60.16604 | 59.58663 | 88.8968 | 10.66533 |
| 61.13846 | 20.36605 | | |

SILICATE COMPOUNDS AS SOLID LI-ION CONDUCTORS

BACKGROUND

Li-ion batteries have traditionally dominated the market of portable electronic devices. However, conventional Li-ion batteries contain flammable organic solvents as components of the electrolyte and this flammability is the basis of a safety risk which is of concern and could limit or prevent the use of Li-ion batteries for application in large scale energy storage.

Replacing the flammable organic liquid electrolyte with a solid Li-conductive phase would alleviate this safety issue, and may provide additional advantages such as improved mechanical and thermal stability. A primary function of the solid Li-conductive phase, usually called solid Li-ion conductor or solid state electrolyte, is to conduct $Li^+$ ions from the anode side to the cathode side during discharge and from the cathode side to the anode side during charge while blocking the direct transport of electrons between electrodes within the battery.

Moreover, lithium batteries constructed with nonaqueous electrolytes are known to form dendritic lithium metal structures projecting from the anode to the cathode over repeated discharge and charge cycles. If and when such a dendrite structure projects to the cathode and shorts the battery energy is rapidly released and may initiate ignition of the organic solvent.

Therefore, there is much interest and effort focused on the discovery of new solid Li-ion conducting materials which would lead to an all solid state lithium battery. Studies in the past decades have focused mainly on ionically conducting oxides such as for example, LISICON ($Li_{14}ZnGe_4O_{16}$), NASICON($Li_{1.3}Al_{0.3}Ti_{1.7}(PO_4)_3$), perovskite (for example, $La_{0.5}Li_{0.5}TiO_3$), garnet ($Li_7La_3Zr_2O_{12}$), LiPON (for example, $Li_{2.88}PO_{3.73}N_{0.14}$) and sulfides, such as, for example, $Li_3PS_4$, $Li_7P_3S_{11}$ and LGPS ($Li_{10}GeP_2S_{12}$).

While recent developments have marked the conductivity of solid Li-ion conductor to the level of 1-10 mS/cm, which is comparable to that in liquid phase electrolyte, finding new Li-ion solid state conductors is of great interest.

An effective lithium ion solid-state conductor will have a high $Li^+$ conductivity at room temperature. Generally, the $Li^+$ conductivity should be no less than $10^{-6}$ S/cm. Further, the activation energy of Li migration in the conductor must be low for use over a range of operation temperatures that might be encountered in the environment. Additionally, the material should have good stability against chemical, electrochemical and thermal degradation. Unlike many conventionally employed non-aqueous solvents, the solid-state conductor material should be stable to electrochemical degradation reactivity with the anode and cathode chemical composition. The material should have low grain boundary resistance for usage in an all solid-state battery. Ideally, the synthesis of the material should be easy and the cost should not be high. Unfortunately, none of the currently known lithium ion solid electrolytes meet all these criteria. For example, $Li_{10}GeP_2S_{12}$ fails to meet the requirement of electrochemical stability and has a high cost due to the presence of Ge, despite its state-of-art Li conductivity. Environmentally stable composite materials having high $Li^+$ conductivity and low activation energy would be sought in order to facilitate manufacturing methods and structure of the battery.

The standard redox potential of Li/Li+ is −3.04 V, making lithium metal one of the strongest reducing agent available. Consequently, Li metal can reduce most known cationic species to a lower oxidation state. Because of this strong reducing capability when the lithium metal of an anode contacts a solid-state $Li^+$ conductor containing cation components different from lithium ion, the lithium reduces the cation specie to a lower oxidation state and deteriorates the solid-state conductor.

For example, the conductor of formula:

$$Li_3PS_4$$

contains $P^{5+}$ in the formula and is thus a secondary cation to the $Li^+$. When in contact with Li metal, reduction according to the following equation occurs (J. Mater. Chem. A, 2016, 4, 3253-3266).

$$Li_3PS_4 + 5Li \rightarrow P + 4Li_2S$$

$$P + 3Li \rightarrow Li_3P$$

Similarly, $Li_{10}GeP_2S_{12}$ has also been reported to undergo degradation when in contact with lithium metal according to the following equations (J. Mater. Chem. A, 2016, 4, 3253-3266):

$$Li_{10}GeP_2S_{12} + 10Li \rightarrow 2P + 8Li_2S + Li_4GeS_4$$

$$P + 3Li \rightarrow Li_3P$$

$$4Li_4GeS_4 + 31Li \rightarrow 16Li_2S + Li_{15}Ge_4$$

$Li_{10}GeP_2S_{12}$ contains $Ge^{4+}$ and $P^{5+}$ and each is reduced as indicated.

In another example, $Li_7La_3Zr_2O_{12}$, which contains secondary cations $La^{3+}$ and $Zr^{4+}$ undergoes chemical degradation when in contact with lithium metal according to the following chemistry (J. Mater. Chem. A, 2016, 4, 3253-3266):

$$6Li_7La_3Zr_2O_{12} + 40Li \rightarrow Zr_3O + 41Li_2O + 9La_2O_3$$

$$Zr_3O + 2Li \rightarrow Li_2O + 3Zr$$

$$La_2O_3 + 6Li \rightarrow 2La + 3Li_2O$$

Thus, many current conventionally known solid Li-ion conductors suffer a stability issue when in contact with a Li metal anode.

The inventors of this application have been studying lithium composite compounds which may serve for future use of solid-state Li+ conductors and previous results of this study are disclosed in U.S. application Ser. No. 15/626,696, filed Jun. 19, 2017, and U.S. Ser. No. 15/805,672, filed Nov. 7, 2017. However, composites of highest efficiency, highest stability, low cost and ease of handling and manufacture continue to be sought.

Accordingly, an object of this application is to identify a range of further materials having high Li ion conductivity while being poor electron conductors which are suitable as a solid state electrolyte for a lithium ion battery.

A further object of this application is to provide a solid state lithium ion battery containing a solid state Li ion electrolyte membrane.

SUMMARY OF THE EMBODIMENTS

These and other objects are provided by the embodiments of the present application, the first embodiment of which includes a solid-state lithium ion electrolyte, comprising: a composite material of formula (I):

$$Li_y(M1)_{x1}Si_{2-x2}(M2)_{x2}O_7 \qquad (I)$$

wherein x1 is a number from 0 to 6 inclusive of 0 and 6, x2 is a number from 0 to 2, inclusive of 0 and 2, and y is a value such that the composite of formula (I) is charge neutral, M1 is at least one element selected from the group of elements consisting of a group 1 element, a group 2 element and a group 12 element, and M2 is at least one element selected from the group of elements consisting of a group 13 element, a group 14 element, and a group 15 element.

In an aspect of the first embodiment a lithium ion (Li$^+$) conductivity of the solid state lithium ion electrolyte is at least 10$^{-5}$ S/cm at 300K.

In another aspect of the first embodiment an activation energy of the composite of formula (I) is 0.4 eV or less.

In a further aspect of the first embodiment, the composite of formula (I) comprises a crystal lattice structure having a tetragonal unit cell.

In a special aspect of the first embodiment the composite of formula (I) is a material of formula (Ia):

$$Li_6Si_2O_7 \quad (Ia).$$

In a second embodiment, a solid-state lithium ion electrolyte, comprising:

a composite material of formula (II) is provided:

$$Li_y(M1)_{x1}Si_{2-x2}(M2)_{x2}Pb_{1-x3}(M3)_{x3}O_7 \quad (II)$$

wherein x1 is a number from 0 to 10 inclusive of 0 and 10, x2 is a number from 0 to 2, inclusive of 0 and 2, x3 is a number from 0 to 1, inclusive of 0 and 1, and y is a value such that the composite of formula (II) is charge neutral, M1 is at least one element selected from the group of elements consisting of a group 1 element, a group 2 element and a group 12 element, M2 is at least one element selected from the group of elements consisting of a group 13 element, a group 14 element, and a group 15 element, and M3 is at least one element selected from a group 2 element, a group 12 element, a group 13 element, a group 14 element and a group 15 element.

In an aspect of the second embodiment a lithium ion (Li$^+$) conductivity of the solid state lithium ion electrolyte is at least 10$^{-5}$ S/cm at 300K.

In another aspect of the second embodiment an activation energy of the composite of formula (II) is 0.45 eV or less.

In a further aspect of the second embodiment, the composite of formula (II) comprises a crystal lattice structure having a monoclinic unit cell.

In a special aspect of the first embodiment the composite of formula (II) is a material of formula (IIa):

$$Li_{10}Si_2PbO_{10} \quad (IIa).$$

In a third embodiment, a solid-state lithium ion electrolyte, comprising:

a composite material of formula (III) is provided:

$$Li_y(M1)_{x1}Si_{2-x2}(M2)_{x2}Al_{1-x3}(M3)_{x3}O_7 \quad (III)$$

wherein x1 is from 0 to 1, inclusive of 0 and 1, x2 is from 0 to 1, inclusive of 0 and 1, x3 is from 0 to 1, inclusive of 0 and 1, and y is a value such that the composite of formula (III) is charge neutral, M1 is at least one element selected from a group 1 element, a group 2 element and a group 12 element, M2 is at least one element selected from a group 13 element, a group 14 element, and a group 15 element, and M3 is at least one element selected from a group 3 element, a group 4 element, a group 13 element, a group 14 element and a group 15 element.

In an aspect of the third embodiment a lithium ion (Li$^+$) conductivity of the solid state lithium ion electrolyte is at least 10$^{-5}$ S/cm at 300K.

In another aspect of the third embodiment an activation energy of the composite of formula (I) is 0.40 eV or less.

In a further aspect of the third embodiment, the composite of formula (III) comprises a crystal lattice structure having a trigonal unit cell.

In a special aspect of the third embodiment the composite of formula (III) is a material of formula (IIIa):

$$LiAlSiO_4 \quad (IIIa).$$

In a further special aspect of the third embodiment the composite of formula (III) is the material of formula (IIIb):

$$Li_{1.33}Al_{1.33}Si_{0.67}O_4 \quad (IIIb).$$

In a fourth embodiment a solid-state lithium ion electrolyte, comprising:

a composite material of formula (IV) is provided:

$$Li_y(M1)_{x1}Si_{2-x2}(M2)_{x2}Be_{1-x3}(M3)_{x3}O_7 \quad (IV)$$

wherein x1 is from 0 to 2, inclusive of 0 and 2, x2 is from 0 to 1, inclusive of 0 and 1, x3 is from 0 to 1, inclusive of 0 and 1, and y is a value such that the composite of formula (IV) is charge neutral, M1 is at least one element selected from the group of elements consisting of a group 1 element, a group 2 element and a group 12 element, M2 is at least one element selected from a group 13 element, a group 14 element, and a group 15 element, and M3 is at least one element selected from a group 1 element, a group 2 element, a group 12 element and a group 13 element.

In an aspect of the fourth embodiment a lithium ion (Li$^+$) conductivity of the solid state lithium ion electrolyte is at least 10$^{-5}$ S/cm at 300K.

In another aspect of the fourth embodiment an activation energy of the composite of formula (I) is 0.40 eV or less.

In a further aspect of the fourth embodiment, the composite of formula (IV) comprises a crystal lattice structure having an orthorhombic unit cell.

In a special aspect of the fourth embodiment the composite of formula (IV) is a material of formula (IVa):

$$Li_2BeSiO_4 \quad (IVa).$$

In a fifth embodiment, a solid-state lithium ion electrolyte, comprising:

a composite material of formula (V) is provided:

$$Li_{2.4}Zn_{4.4}Si_{5.2}O_{16} \quad (V).$$

In a sixth embodiment a solid state lithium battery is included. The solid state lithium battery comprises: an anode; a cathode; and a solid state lithium ion electrolyte located between the anode and the cathode; wherein the solid state lithium ion electrolyte comprises a composite material according to any of the above described five embodiments and aspects thereof.

The foregoing description is intended to provide a general introduction and summary of the present disclosure and is not intended to be limiting in its disclosure unless otherwise explicitly stated. The presently preferred embodiments, together with further advantages, will be best understood by reference to the following detailed description taken in conjunction with the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 3 shows a table listing the peak positions and intensity for peaks of relative intensity of 1 or greater compared to the peak of greatest intensity in the XRD analysis of $Li_6Si_2O_7$ in FIG. 2.

FIG. 6 shows a table listing the peak positions and intensity for peaks of relative intensity of 1 or greater compared to the peak of greatest intensity in the XRD analysis of FIG. 5.

FIG. 9 shows a table listing the peak positions and intensity for peaks of relative intensity of 1 or greater compared to the peak of greatest intensity in the XRD analysis of FIG. 8.

FIG. 12 shows a table listing the peak positions and intensity for peaks of relative intensity of 1 or greater compared to the peak of greatest intensity in the XRD analysis of FIG. 11.

FIG. 15 shows a table listing the peak positions and intensity for peaks of relative intensity of 1 or greater compared to the peak of greatest intensity in the XRD analysis of FIG. 14.

DESCRIPTION OF THE PREFERRED EMBODIMENTS

Figure 1:
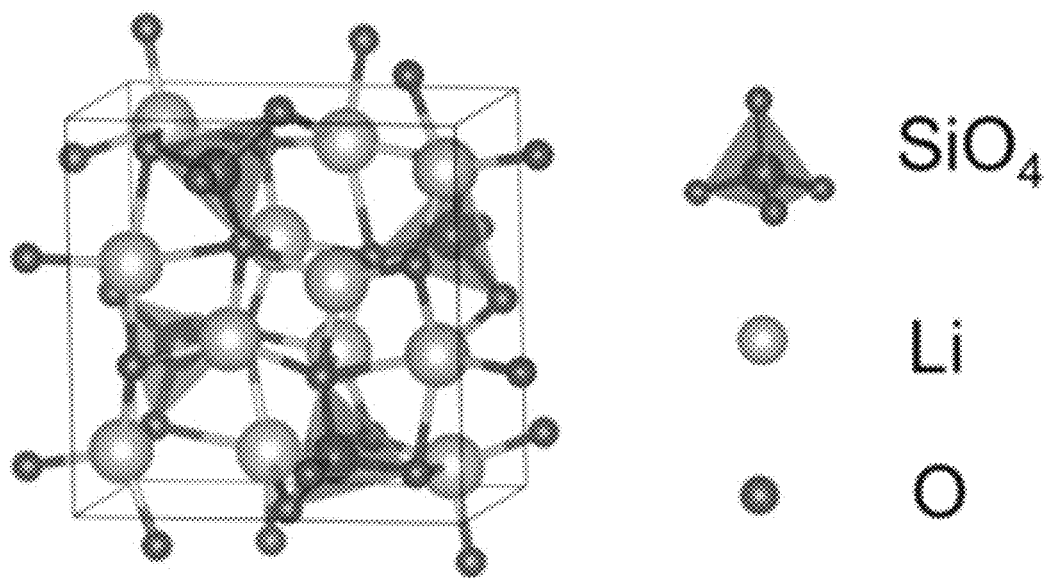
FIG. 1 shows the crystal structure of $Li_6Si_2O_7$.

Throughout this description, the terms "electrochemical cell" and "battery" may be employed interchangeably unless the context of the description clearly distinguishes an electrochemical cell from a battery. Further the terms "solid-state electrolyte" and "solid-state ion conductor" may be employed interchangeably unless explicitly specified differently.

Structural characteristics of effective $Li^+$ conducting crystal lattices have been described by Ceder et al. (Nature Materials, 14, 2015, 1026-1031) in regard to known $Li^+$ ion conductors $Li_{10}GeP_2S_{12}$ and $Li_7P_3S_{11}$, where the sulfur sublattice of both materials was shown to very closely match a bcc lattice structure. Further, $Li^+$ ion hopping across adjacent tetrahedral coordinated $Li^+$ lattice sites was indicated to offer a path of lowest activation energy.

The inventors are conducting ongoing investigations of new lithium composite compounds in order to identify materials having the properties which may serve as solid-state electrolytes in solid state lithium batteries. In the course of this ongoing study and effort the inventors have developed and implemented a methodology to identify composite materials which have chemical and structural properties which have been determined by the inventors as indicators of lithium ion conductance suitable to be a solid state electrolyte for a lithium-ion battery.

To qualify as solid state electrolyte in practical applications, the material must meet several certain criteria. First, it should exhibit desirable Li-ion conductivity, usually no less than $10^{-6}$ S/cm at room temperature. Second, the material should have good stability against chemical, electrochemical and thermal degradation. Third, the material should have low grain boundary resistance for usage in all solid-state battery. Fourth, the synthesis of the material should be easy and the cost should not be high.

A criterion of this methodology requires that to qualify as solid state electrolyte in practical application, the material must exhibit desirable Li-ion conductivity, usually no less than $10^{-6}$ S/cm at room temperature. Thus, ab initio molecular dynamics simulation studies were applied to calculate the diffusivity of Li ion in the lattice structures of selected silicate materials. In order to accelerate the simulation, the calculation was performed at high temperatures and the effect of excess Li or Li vacancy was considered. In order to create excess Li or Li vacancy, aliovalent replacement of cation or anions may be evaluated. Thus, Li vacancy was created by, for example, partially substituting Si with aliovalent cationic species while compensating the charge neutrality with Li vacancy or excess Li. For example, replacing 50% of Si in $Li_{10}Si_2PbO_{10}$ with P results in the formation of $Li_9PSiPbO_{10}$.

The diffusivity at 300 K was determined according to equation (I)

$$D=D_0 \exp(-E_a/k_bT) \qquad \text{equation (I)}$$

where $D_0$, $E_a$ and $k_b$ are the pre-exponential factor, activation energy and Boltzmann constant, respectively. The conductivity is related with the calculated diffusivity according to equation (II):

$$\sigma=D_{300}\rho e^2/k_bT \qquad \text{equation (II)}$$

where $\rho$ is the volumetric density of Li ion and e is the unit charge.

The anionic lattice of Li-ion conductors has been shown to match certain lattice types (see Nature Materials, 14, 2015, 2016). Therefore, in the anionic lattice of the potential $Li^+$ ion conductor is compared to the anionic lattice of $Li^+$ ion conductor known to have high conductivity.

Thus, selected lithium silicate compounds were compared to Li-containing compounds reported in the inorganic crystal structure database (FIZ Karlsruhe ICSD—https://icsd.fiz-karlsruhe.de) and evaluated in comparison according to an anionic lattice matching method developed by the inventors for this purpose and described in copending U.S. application Ser. No. 15/597,651, filed May 17, 2017, to match the lattice of these compounds to known Li-ion conductors.

According to the anionic lattice matching method described in copending U.S. application Ser. No. 15/597,651, an atomic coordinate set for the compound lattice structure may be converted to a coordinate set for only the anion lattice. The anions of the lattice are substituted with the anion of the comparison material and the obtained unit cell rescaled. The x-ray diffraction data for modified anion-only lattice may be simulated and an n×2 matrix generated from the simulated diffraction data. Quantitative structural similarity values can be derived from the n×2 matrices.

The purpose of anionic lattice matching is to further identify compounds with greatest potential to exhibit high $Li^+$ conductivity. From this work, the compounds described in the embodiments which follow were determined to be potentially suitable as a solid-state $Li^+$ conductors.

Figure 11:
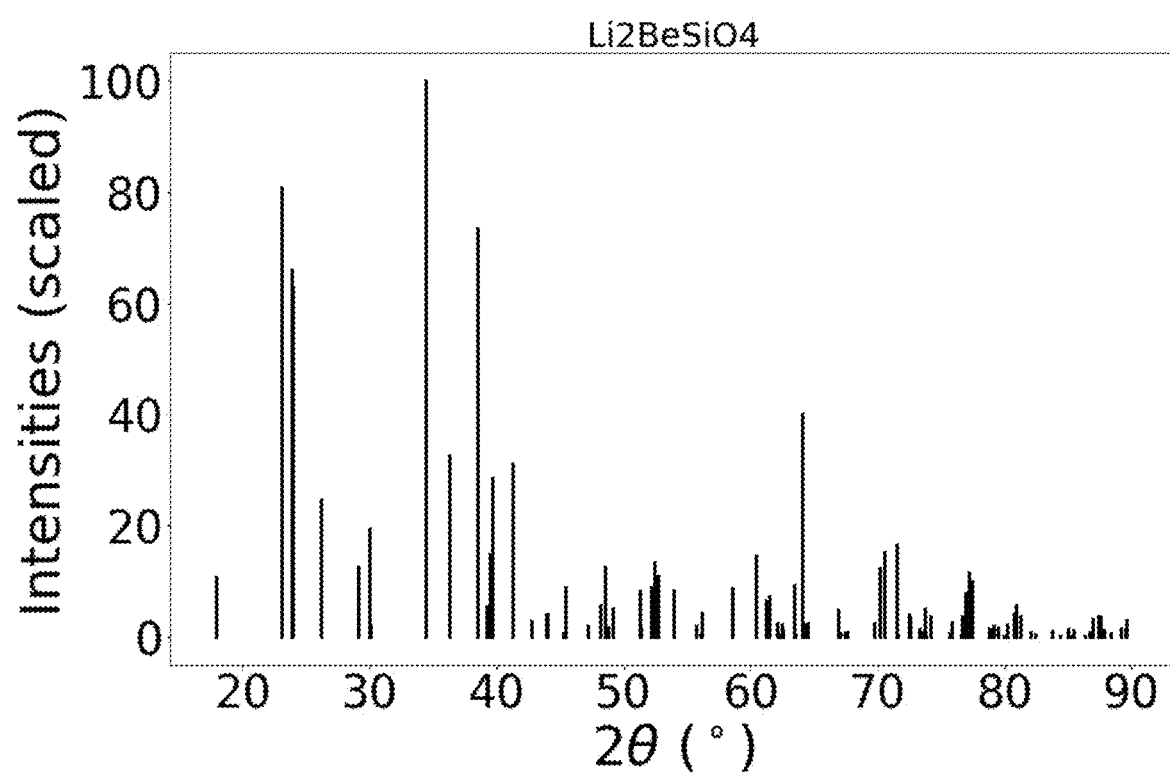
FIG. 11 shows the XRD analysis of the crystal structure of $Li_2BeSiO_4$.

Ab initio molecular dynamics (AIMD) simulation was then applied to predict the conductivity of the targeted lithium silicates. The initial structures were statically relaxed and were set to an initial temperature of 100 K. The structures were then heated to targeted temperatures (750-1150 K) at a constant rate by velocity scaling over a time period of 2 ps. The total time of AIMD simulations were in the range of 200 to 400 ps. A typical example of the calculated diffusivity as a function of temperature is shown in FIG. 11. The Li$^+$ diffusivity at different temperatures from 750-1150 K follows an Arrhenius-type relationship.

Applying equation (I) above the diffusivity at 300 K was determined and then the conductivity may be determined using the link between conductivity and diffusivity of equation (II).

Accordingly, the first embodiment provides a solid-state lithium ion electrolyte, comprising: a composite material of formula (I):

$$Li_y(M1)_{x1}Si_{2-x2}(M2)_{x2}O_7 \quad (I)$$

wherein x1 is a number from 0 to 6 inclusive of 0 and 6, x2 is a number from 0 to 2, inclusive of 0 and 2, and y is a value such that the composite of formula (I) is charge neutral, wherein M1 is at least one element selected from the group of elements consisting of a group 1 element, a group 2 element and a group 12 element, and M2 is at least one element selected from the group of elements consisting of a group 13 element, a group 14 element, and a group 15 element.

The composite materials of formula (I) have a crystal structure comprising tetragonal unit cell (P42/m) with lattice parameters: a=7.72 Å and c=4.88 Å. The lithium ion (Li$^+$) conductivities of the solid state lithium ion electrolytes of formula (I) are at least 10$^{-5}$ S/cm at 300K and the activation energy of the composite of formula (I) is 0.4 eV or less.

In a special aspect of the first embodiment the composite of formula (I) may be a material of formula (Ia):

$$Li_6Si_2O_7 \quad (Ia).$$

Figure 2:
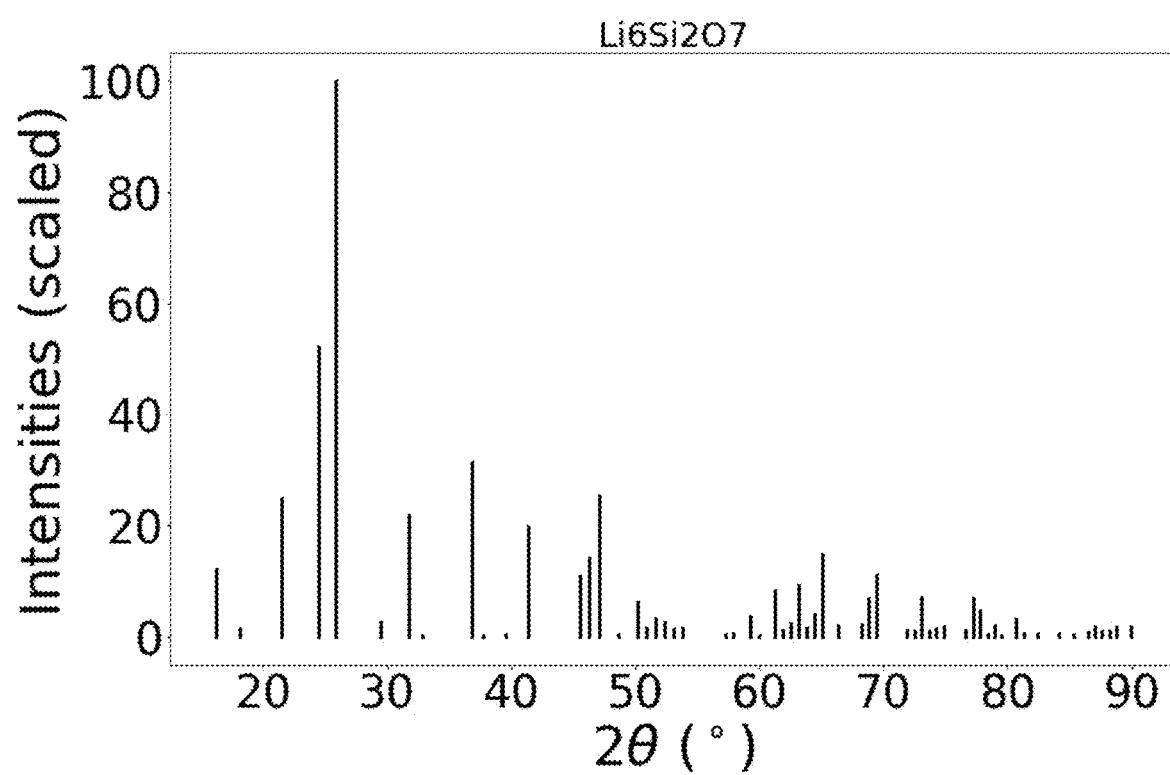
FIG. 2 shows the XRD analysis of the crystal structure of $Li_6Si_2O_7$.

The activation energy and room temperature conductivity determined for the composite of formula 1(a) are shown in Table 1. FIG. 1 shows a diagram of the lattice structure for the composite of formula (Ia) and FIG. 2 shows a computer generated XRD analysis of the composite of formula (Ia) The Table of FIG. 3 lists the respective XRD peaks and their relative intensities compared to the peak of greatest intensity in the XRD analysis. The major characteristic peaks are listed in Table 2.

TABLE 2

Major Peaks in XRD Analysis of Li$_6$Si$_2$O$_7$

| Peak Position | Relative Intensity |
|---|---|
| 21.55 | 24.8 |
| 24.47 | 52.16 |
| 25.82 | 100 |
| 31.76 | 21.87 |
| 36.84 | 31.47 |
| 41.38 | 19.87 |
| 47.12 | 25.34 |

In a second embodiment, a solid-state lithium ion electrolyte, comprising: a composite material of formula (II) is provided:

$$Li_y(M1)_{x1}Si_{2-x2}(M2)_{x2}Pb_{1-x3}(M3)_{x3}O_7 \quad (II)$$

wherein x1 is a number from 0 to 10 inclusive of 0 and 10, x2 is a number from 0 to 2, inclusive of 0 and 2, x3 is a number from 0 to 1, inclusive of 0 and 1, and y is a value such that the composite of formula (II) is charge neutral, M1 is at least one element selected from the group of elements consisting of a group 1 element, a group 2 element and a group 12 element, M2 is at least one element selected from the group of elements consisting of a group 13 element, a group 14 element, and a group 15 element, M3 is at least one element selected from a group 2 element, a group 12 element, a group 13 element, a group 14 element and a group 15 element.

The composite materials of formula (II) have a crystal structure comprising a monoclinic unit cell (C2/m) with lattice parameters: a=29.85 Å, b=6.11 Å and c=5.13 Å. The lithium ion (Li$^+$) conductivities of the solid state lithium ion electrolytes of formula (II) are at least 10$^{-5}$ S/cm at 300K and the activation energy of the composite of formula (I) is 0.45 eV or less.

In a further aspect of the second embodiment, the composite of formula (II) comprises a crystal lattice structure having a monoclinic unit cell.

In a special aspect of the second embodiment the composite of formula (II) is a material of formula (IIa):

$$Li_{10}Si_2PbO_{10} \quad (IIa).$$

Figure 4:
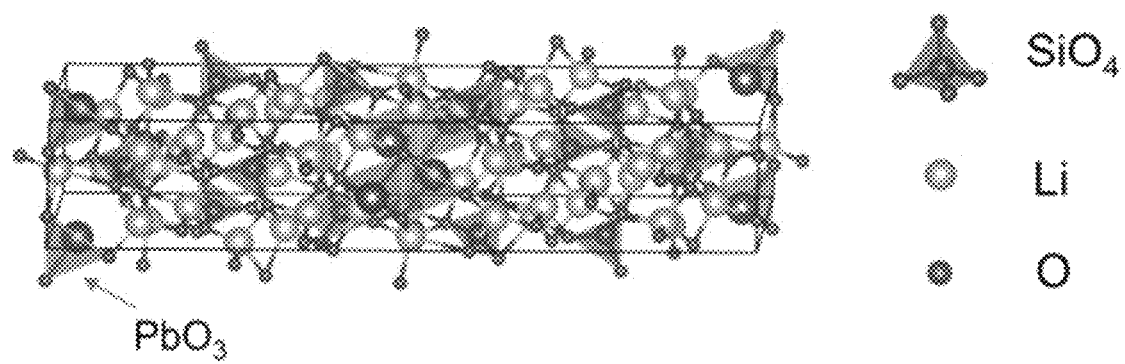
FIG. 4 shows the crystal structure of $Li_{10}Si_2PbO_{10}$.
Figure 5:
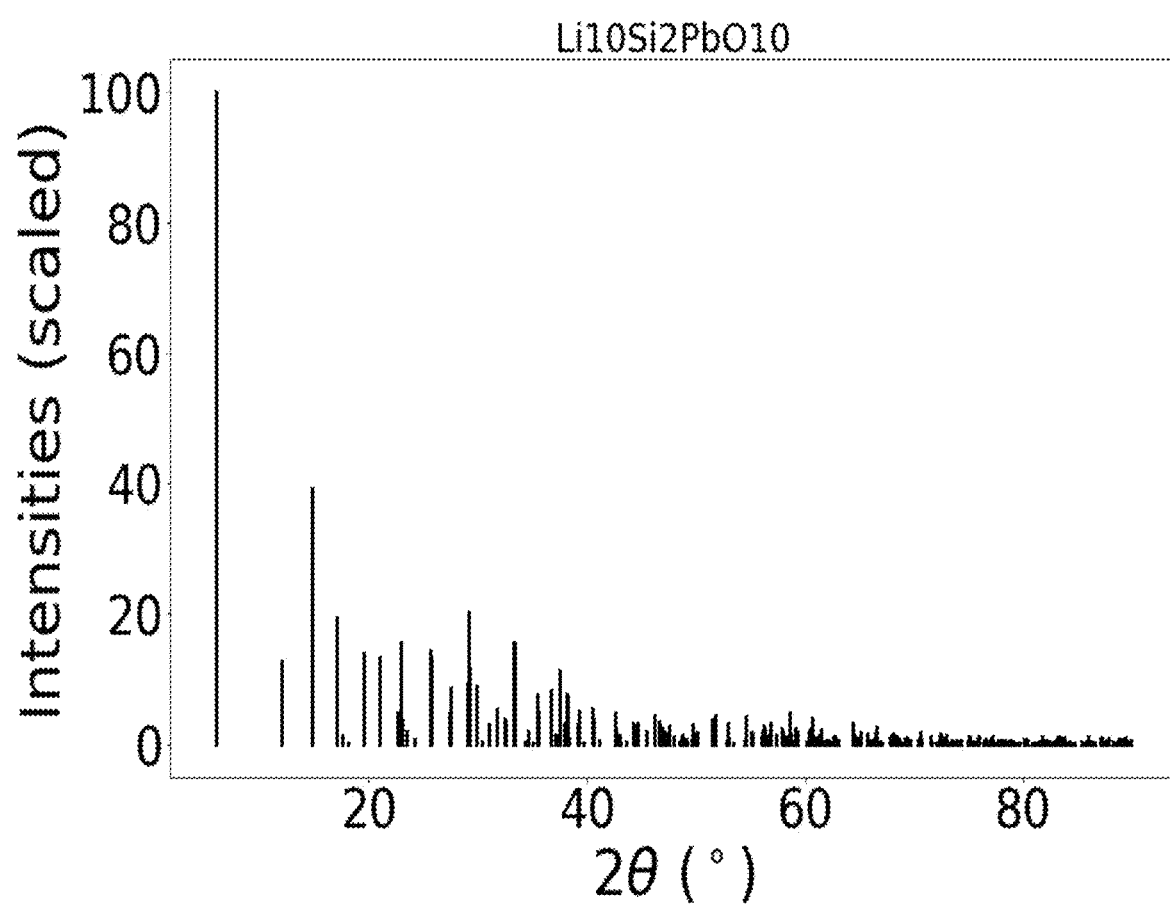
FIG. 5 shows the XRD analysis of the crystal structure of $Li_{10}Si_2PbO_{10}$.

FIG. 4 shows a diagram of the lattice structure of the composite of formula (IIa) and FIG. 5 shows a computer generated XRD analysis of the composite of formula (IIa). The Table of FIG. 6 lists the respective XRD peaks and their relative intensities compared to the peak of greatest intensity. Table 3 lists the major characteristic peaks.

TABLE 3

Major Peaks in XRD Analysis of Li$_{10}$Si$_2$PbO$_{10}$

| Peak Position | Relative Intensity |
|---|---|
| 6.00 | 100 |
| 14.82 | 39.20 |
| 19.51 | 14.04 |
| 22.96 | 15.65 |
| 29.12 | 20.20 |
| 33.33 | 15.58 |
| 33.42 | 15.45 |

In a third embodiment, a solid-state lithium ion electrolyte, comprising:
a composite material of formula (III) is provided:

$$Li_y(M1)_{x1}Si_{2-x2}(M2)_{x2}Al_{1-x3}(M3)_{x3}O_7 \quad (III)$$

wherein x1 is from 0 to 1, inclusive of 0 and 1, x2 is from 0 to 1, inclusive of 0 and 1, x3 is from 0 to 1, inclusive of 0 and 1, and y is a value such that the composite of formula (III) is charge neutral, M1 is at least one element selected from a group 1 element, a group 2 element and a group 12 element, M2 is at least one element selected from a group 13 element, a group 14 element, and a group 15 element, and M3 is at least one element selected from a group 3 element, a group 4 element, a group 13 element, a group 14 element and a group 15 element.

The composite materials of formula (III) have a crystal structure comprising a trigonal unit cell (R3) with lattice parameters: a=13.53 Å and c=9.04 Å. The lithium ion (Li) conductivities of the solid state lithium ion electrolytes of formula (III) are at least 10$^{-6}$ S/cm at 300K and the activation energy of the composite of formula (I) is 0.40 eV or less.

In a special aspect of the third embodiment the composite of formula (III) is a material of formula (IIIa):

$$LiAlSiO_4 \quad (IIIa).$$

Figure 7:
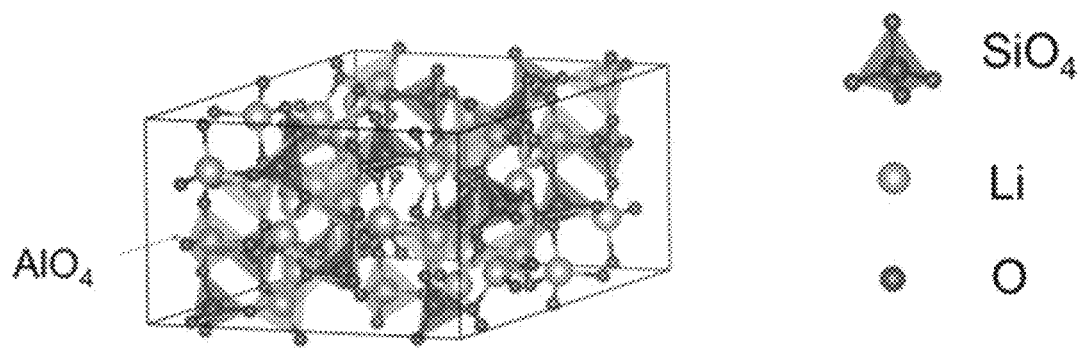
FIG. 7 shows the crystal structure of $LiAlSiO_4$.
Figure 8:
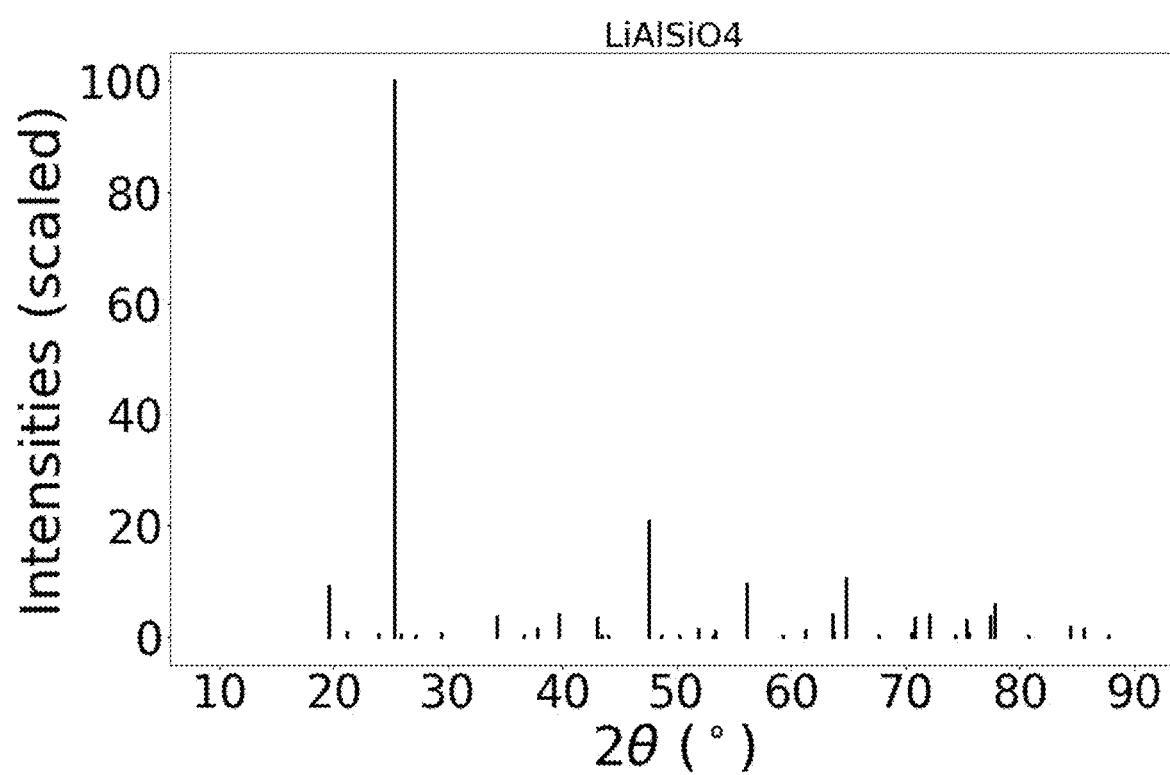
FIG. 8 shows the XRD analysis of the crystal structure of $LiAlSiO_4$.

FIG. 7 shows a diagram of the lattice structure of the composite of formula (IIIa) and FIG. 8 shows the computer generated XRD analysis of the composite of formula (IIIa). The Table of FIG. 9 shows the peaks and relative intensities compared to the peak of greatest intensity for the XRD analysis shown in FIG. 8. Table 4 shows the major peaks in the XRD analysis.

TABLE 4

Major Peaks in XRD Analysis of LiAlSiO$_4$

| Peak Position | Relative Intensity |
|---|---|
| 19.56 | 9.06 |
| 25.28 | 100 |
| 47.58 | 20.94 |
| 56.08 | 9.61 |
| 64.75 | 10.64 |

In a further special aspect of the third embodiment the composite of formula (III) is the material of formula (IIIb):

$$Li_{1.33}Al_{1.33}Si_{0.67}O_4 \quad \text{(IIIb)}.$$

In a fourth embodiment a solid-state lithium ion electrolyte, comprising:

a composite material of formula (IV) is provided:

$$Li_y(M1)_{x1}Si_{2-x2}(M2)_{x2}Be_{1-x3}(M3)_{x3}O_7 \quad \text{(IV)}$$

wherein x1 is from 0 to 2, inclusive of 0 and 2, x2 is from 0 to 1, inclusive of 0 and 1, x3 is from 0 to 1, inclusive of 0 and 1, and y is a value such that the composite of formula (IV) is charge neutral, M1 is at least one element selected from the group of elements consisting of a group 1 element, a group 2 element and a group 12 element, M2 is at least one element selected from a group 13 element, a group 14 element, and a group 15 element, and M3 is at least one element selected from a group 1 element, a group 2 element, a group 12 element and a group 13 element.

The composite materials of formula (IV) have a crystal structure comprising an orthorhombic unit cell (Pmnb) with lattice parameters: a=6.41 Å, b=10.52 Å and c=5.04 Å. The lithium ion (Li$^+$) conductivities of the solid state lithium ion electrolytes of formula (IV) are at least 10$^{-6}$ S/cm at 300K and the activation energy of the composite of formula (I) is 0.4 eV or less.

In a special aspect of the fourth embodiment the composite of formula (IV) is a material of formula (IVa):

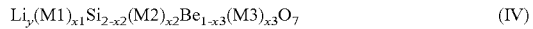

$$Li_2BeSiO_4 \quad \text{(IVa)}.$$

Figure 10:
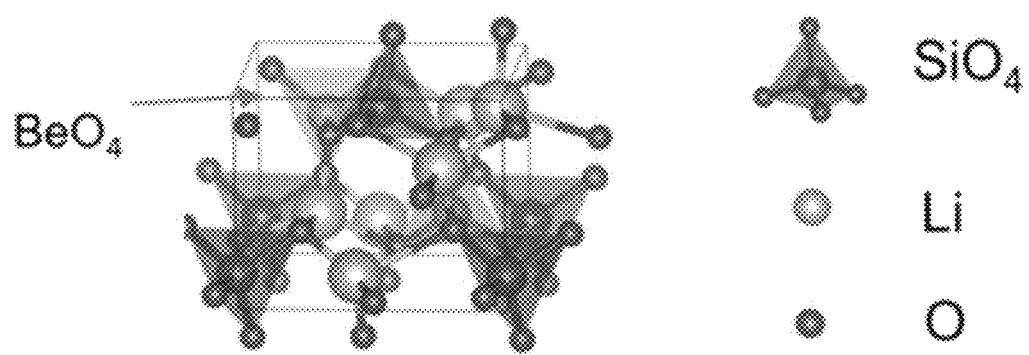
FIG. 10 shows the crystal structure of $Li_2BeSiO_4$.

FIG. 10 shows a diagram of the lattice structure of the composite of formula (IVa) and FIG. 11 shows a computer generated XRD analysis of the composite of formula (IVa). The Table of FIG. 12 lists the peaks and their relative intensities compared to the peak of greatest intensity of the XRD analysis of FIG. 11. Table 5 shows the major peaks in the XRD analysis.

TABLE 5

Major Peaks in XRD Analysis of Li$_2$BeSiO$_4$

| Peak Position | Relative Intensity |
|---|---|
| 23.09 | 80.7 |
| 23.85 | 60.01 |
| 23.99 | 62.79 |
| 26.20 | 24.78 |
| 34.42 | 100 |
| 36.30 | 32.57 |

TABLE 5-continued

Major Peaks in XRD Analysis of Li$_2$BeSiO$_4$

| Peak Position | Relative Intensity |
|---|---|
| 38.47 | 73.38 |
| 39.67 | 28.52 |
| 41.26 | 31.18 |
| 64.09 | 40.17 |

In a fifth embodiment, a solid-state lithium ion electrolyte, comprising: a composite material of formula (V) is provided:

$$Li_{2.4}Zn_{4.4}Si_{5.2}O_{16} \quad \text{(V)}.$$

Figure 13:
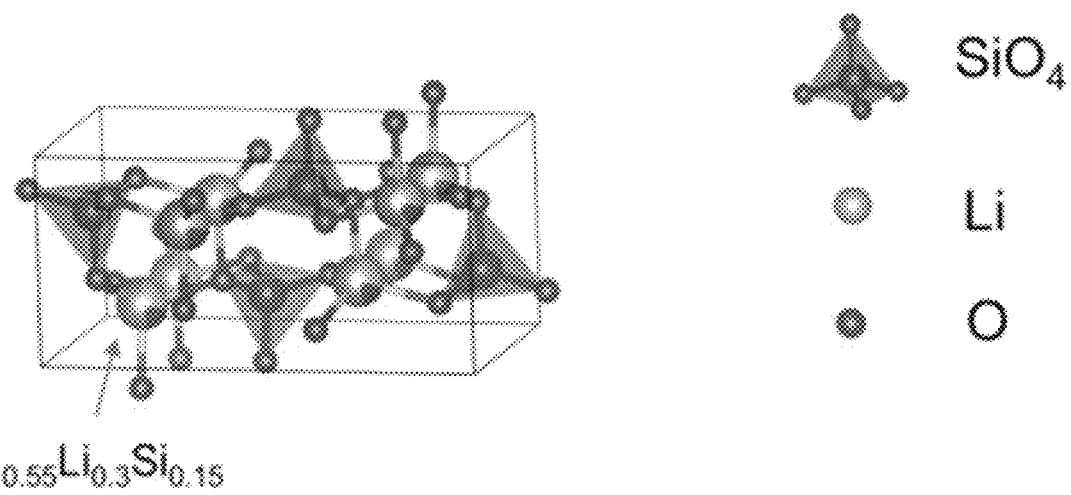
FIG. 13 shows the crystal structure of $Li_{2.4}Zn_{4.4}Si_{5.2}O_{16}$.
Figure 14:
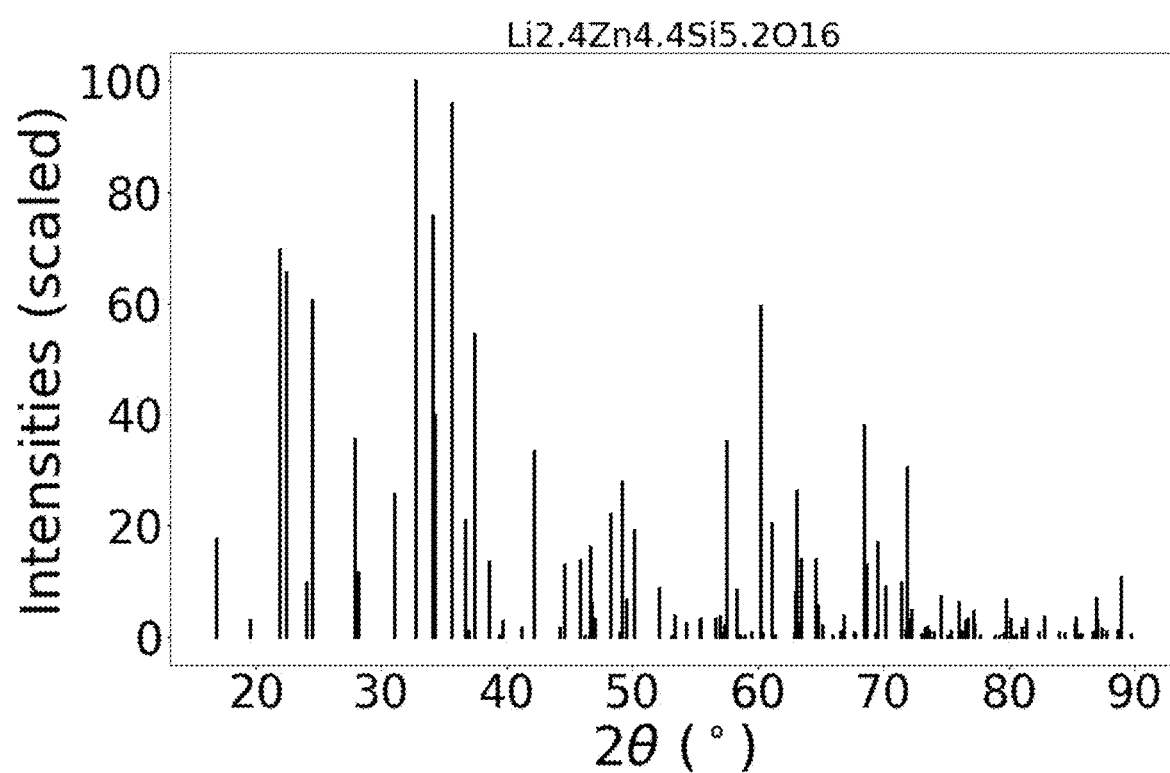
FIG. 14 shows the XRD analysis of the crystal structure of $Li_{2.4}Zn_{4.4}Si_{5.2}O_{16}$.
Figure 16:
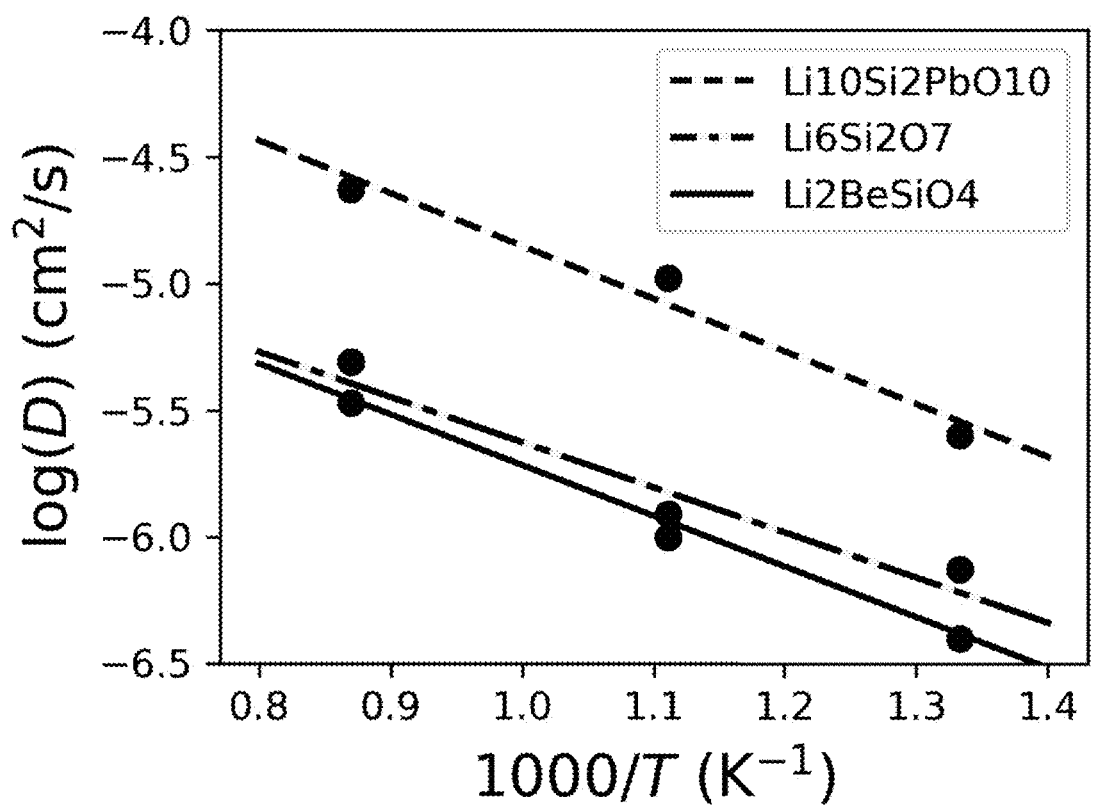
FIG. 16 shows an Arrhenius plot of $Li^+$ diffusivity (D) in $Li_{10}Si_2PbO_{10}$ and $Li_6Si_2O_7$.

The composite material of formula (V) has a crystal structure comprising a monoclinic unit cell (Pmnb) with lattice parameters: a=6.4 Å, b=10.5 Å and c=5.0 Å. FIG. 13 shows a diagram of the lattice structure and FIG. 14 shows a computer generated XRD analysis of composite of formula (V). The Table of FIG. 15 shows the peaks and their relative intensities compared to the peak of greatest intensity in the XRD analysis of FIG. 14. Table 6 shows the major peaks in the XRD analysis.

TABLE 6

Major Peaks in XRD Analysis of Li$_{2.4}$Zn$_{4.4}$Si$_{5.2}$O$_{16}$

| Peak Position | Relative Intensity |
|---|---|
| 21.86 | 69.54 |
| 22.44 | 65.65 |
| 24.45 | 60.49 |
| 27.85 | 35.59 |
| 32.73 | 100 |
| 34.09 | 75.78 |
| 34.24 | 39.79 |
| 35.60 | 95.85 |
| 39.40 | 54.39 |
| 42.20 | 33.36 |
| 57.55 | 35.15 |
| 60.16 | 59.58 |
| 68.48 | 38.12 |

The lithium ion (Li$^+$) conductivities of the solid state lithium ion electrolytes of formula (V) are at least 10$^{-6}$ S/cm at 300K and the activation energy of the composite of formula (V) is 0.5 eV or less.

TABLE 1

Activation energy and room temperature conductivity from AIMD simulations.

| composition | $E_a$ (eV) | σ (S/cm) |
|---|---|---|
| Li$_6$Si$_2$O$_7$ | 0.36 | 4 × 10$^{-5}$ at 300 K |
| Li$_{10}$Si$_2$PbO$_{10}$ | 0.42 | 6 × 10$^{-5}$ at 300 K |
| Li$_2$BeSiO$_4$ | 0.39 | 7 × 10$^{-6}$ at 300 K |
| LiAlSiO$_4$ | | 1.1 × 10−1 at 1150 K |

Synthesis of the composite materials of the embodiments described above may be achieved by solid state reaction between stoichiometric amounts of selected precursor materials. Exemplary methods of solid state synthesis are described for example in each of the following papers: i) Monatshefte für Chemie, 100, 295-303, 1969; ii) Journal of Solid State Chemistry, 128, 1997, 241; iii) Zeitschrift für Naturforschung B, 50, 1995, 1061; iv) Journal of Solid State Chemistry 130, 1997, 90; v) Journal of Alloys and Compounds, 645, 2015, S174; and vi) Z. Naturforsch. 51b, 199652 5.

In further embodiments, the present application includes solid state lithium ion batteries containing the solid-state electrolytes described above. Solid-state batteries of these embodiments including metal-metal solid-state batteries may have higher charge/discharge rate capability and higher power density than classical batteries and may have the potential to provide high power and energy density.

Thus, in further embodiments, solid-state batteries comprising: an anode; a cathode; and a solid state lithium ion electrolyte according to the embodiments described above, located between the anode and the cathode are provided.

The anode may be any anode structure conventionally employed in a lithium ion battery. Generally such materials are capable of insertion and extraction of Li$^+$ ions. Example anode active materials may include graphite, hard carbon, lithium titanate (LTO), a tin/cobalt alloy and silicon/carbon composites. In one aspect the anode may comprise a current collector and a coating of a lithium ion active material on the current collector. Standard current collector materials include but are not limited to aluminum, copper, nickel, stainless steel, carbon, carbon paper and carbon cloth. In an aspect advantageously arranged with the solid-state lithium ion conductive materials described in the first and second embodiments, the anode may be lithium metal or a lithium metal alloy, optionally coated on a current collector. In one aspect, the anode may be a sheet of lithium metal serving both as active material and current collector.

The cathode structure may be any conventionally employed in lithium ion batteries, including but not limited to composite lithium metal oxides such as, for example, lithium cobalt oxide (LiCoO$_2$), lithium manganese oxide (LiMn$_2$O$_4$), lithium iron phosphate (LiFePO$_4$) and lithium nickel manganese cobalt oxide. Other active cathode materials may also include elemental sulfur and metal sulfide composites. The cathode may also include a current collector such as copper, aluminum and stainless steel.

In one aspect, the active cathode material may be a transition metal, preferably, silver or copper. A cathode based on such transition metal may not include a current collector.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. In this regard, certain embodiments within the invention may not show every benefit of the invention, considered broadly.

The invention claimed is:

1. A solid state lithium battery, comprising:
an anode;
a cathode; and
a solid state lithium ion electrolyte located between the anode and the cathode;
wherein
the solid state lithium ion electrolyte comprises a composite material of formula (I):

$$\text{Li}_y(\text{M1})_{x1}\text{Si}_{2-x2}(\text{M2})_{x2}\text{O}_7 \tag{I}$$

wherein
x1 is a number from 0 to 6 inclusive of 0 and 6,
x2 is a number from 0 to 2, inclusive of 0 and 2, and
y is a value such that the composite of formula (I) is charge neutral,
M1 is at least one element selected from the group of elements consisting of a group 1 element, a group 2 element and a group 12 element, and
M2 is at least one element selected from the group of elements consisting of a group 13 element, a group 14 element, and a group 15 element.

2. A solid state lithium battery, comprising:
an anode;
a cathode; and
a solid state lithium ion electrolyte located between the anode and the cathode;
wherein
the solid state lithium ion electrolyte comprises a composite material of formula (II):

$$\text{Li}_y(\text{M1})_{x1}\text{Si}_{2-x2}(\text{M2})_{x2}\text{Pb}_{1-x3}(\text{M3})_{x3}\text{O}_7 \tag{II}$$

wherein
x1 is a number from 0 to 10 inclusive of 0 and 10,
x2 is a number from 0 to 2, inclusive of 0 and 2,
x3 is a number from 0 to 1, inclusive of 0 and 1, and
y is a value such that the composite of formula (II) is charge neutral,
M1 is at least one element selected from the group of elements consisting of a group 1 element a group 2 element and a group 12 element,
M2 is at least one element selected from the group of elements consisting of a group 13 element, a group 14 element, and a group 15 element, and
M3 is at least one element selected from a group 2 element, a group 12 element, a group 13 element, a group 14 element and a group 15 element.

3. A solid state lithium battery, comprising:
an anode;
a cathode; and
a solid state lithium ion electrolyte located between the anode and the cathode;
wherein
the solid state lithium ion electrolyte comprises a composite material of formula (III):

$$\text{Li}_y(\text{M1})_{x1}\text{Si}_{2-x2}(\text{M2})_{x2}\text{Al}_{1-x3}(\text{M3})_{x3}\text{O}_7 \tag{III}$$

wherein
x1 is from 0 to 1, inclusive of 0 and 1,
x2 is from 0 to 1, inclusive of 0 and 1,
x3 is from 0 to 1, inclusive of 0 and 1,
y is a value such that the composite of formula (III) is charge neutral,
M1 is at least one element selected from a group 1 element, a group 2 element and a group 12 element,
M2 is at least one element selected from a group 13 element, a group 14 element, and a group 15 element, and
M3 is at least one element selected from a group 3 element, a group 4 element, a group 13 element, a group 14 element and a group 15 element.

4. A solid state lithium battery, comprising:
an anode;
a cathode; and
a solid state lithium ion electrolyte located between the anode and the cathode;
wherein
the solid state lithium ion electrolyte comprises a composite material of formula (IV):

$$\text{Li}_y(\text{M1})_{x1}\text{Si}_{2-x2}(\text{M2})_{x2}\text{Be}_{1-x2}(\text{M3})_{x3}\text{O}_7 \tag{IV}$$

wherein x1 is from 0 to 2, inclusive of 0 and 2,
x2 is from 0 to 1, inclusive of 0 and 1,
x3 is from 0 to 1, inclusive of 0 and 1,
y is a value such that the composite of formula (IV) is charge neutral,
M1 is at least one element selected from the group of elements consisting of a group 1 element, a group 2 element and a group 12 element,
M2 is at least one element selected from a group 13 element, a group 14 element, and a group 15 element, and
M3 is at least one element selected from a group 1 element, a group 2 element, a group 12 element and a group 13 element.

5. A solid state lithium battery, comprising:
an anode;
a cathode; and
a solid state lithium ion electrolyte located between the anode and the cathode;
wherein
the solid state lithium ion electrolyte comprises a composite material of formula (V):

$$Li_{2.4}Zn_{4.4}Si_{5.2}O_{16} \qquad (V).$$

\* \* \* \* \*